United States Patent [19]

Hayes et al.

[11] 4,012,329

[45] Mar. 15, 1977

[54] WATER-IN-OIL MICROEMULSION DRILLING FLUIDS

[75] Inventors: John B. Hayes; Gerald W. Haws; William B. Gogarty, all of Littleton, Colo.

[73] Assignee: Marathon Oil Company, Findlay, Ohio

[22] Filed: Sept. 22, 1975

[21] Appl. No.: 615,280

Related U.S. Application Data

[63] Continuation-in-part of Ser. No. 391,109, Aug. 27, 1973, abandoned.

[52] U.S. Cl. .............................. 252/8.5 P; 175/65; 252/308; 252/309

[51] Int. Cl.² ...................... C09K 7/02; C09K 7/06

[58] Field of Search ............ 252/8.5 M, 8.5 P, 308, 252/309; 166/273, 274, 275; 175/65

[56] References Cited

UNITED STATES PATENTS

| | | | |
|---|---|---|---|
| 2,696,468 | 12/1954 | Fischer | 252/8.5 M |
| 2,739,120 | 3/1956 | Fischer | 252/8.5 M |
| 3,002,923 | 10/1961 | Barker et al. | 252/8.5 P |
| 3,111,491 | 11/1963 | Atkins | 252/8.5 M |
| 3,252,903 | 5/1966 | Crittendon | 252/8.5 P |
| 3,254,714 | 6/1966 | Gogarty et al. | 166/275 |
| 3,330,343 | 7/1967 | Tosch et al. | 166/275 |
| 3,734,856 | 5/1973 | Son | 252/8.5 M |

*Primary Examiner*—Herbert B. Guynn
*Attorney, Agent, or Firm*—Joseph C. Herring; Jack L. Hummel

[57] ABSTRACT

An oil-external microemulsion drilling fluid having a wide range of tolerance for salinity, having good gel strength and low fluid loss characteristics, and also obtained by mixing about 1% to about 30% of a sodium petroleum sulfonate having an average equivalent weight within the range of about 350 to about 525, about 5% to about 84% of a hydrocarbon (e.g. diesel fuel), about 15% to about 90% of an aqueous medium (can contain water soluble salts), about 0.01 to about 20% of a cosurfactant (e.g. alcohols such as primary amyl alcohol) and about 0.1 to about 15% of bentonite clay. Weighting agents, e.g. barite, and other desired additives can be added to the microemulsion.

24 Claims, No Drawings

WATER-IN-OIL MICROEMULSION DRILLING FLUIDS

CROSS REFERENCE TO RELATED APPLICATIONS

This is a continuation-in-part of our copending patent application, Ser. No. 391,109, filed Aug. 27, 1973, now abandoned.

BACKGROUND OF THE INVENTION

1. Field of the Invention

This invention defines a composition useful as a drilling fluid. The composition is an oil-external microemulsion containing sodium petroleum sulfonate, water, hydrocarbon, bentonite, and optionally, cosurfactant.

2. Description of the Prior Art

Drilling fluids desirably have a variety of characteristics to facilitate exploitation of hydrocarbons in subterranean reservoirs. For example, the drilling fluid desirably lubricates and cools the drill string and bit during drilling operations, supports to some degree the weight of drill string and casing, prevents the sticking of drill pipe while in the borehole, keeps cuttings in suspension, carries the cuttings from the bit to the surface, releases the cuttings and any gas in the drilling fluid at the surface, provides well bore stability, prevents fluid from entering reservoir formations (i.e. prevents fluid loss), prevents formation fluids (oil, gas, water) from entering the well bore, provides corrosion protection, controls formation pressures, and aids in well-logging techniques (e.g. conducts electrical current needed for conventional electrical logging), etc. To perform the above functions, it is desired that the drilling fluid should:

1. have sufficient viscosity to support and transport cuttings and weighting materials;
2. be fluid and pumpable,
3. have sufficient gel strength to support cuttings and weighting materials when circulation stops;
4. be stable at a wide range of pressures, temperatures, and shear rates;
5. have the property to build filter cakes on the formation to prevent fluid loss;
6. be chemically flexible so that the pH, etc. of the drilling fluid can be controlled; and
7. conduct electrical current. The prior art does not know of a drilling fluid that will effectively meet all of the above requirements.

Four basic types of drilling fluids are presently available to the industry:

1. Water-based mud which is the most common and which consists of water (fresh or salt), various clays, weighting materials, and other necessary additives;
2. Oil-in-water emulsion muds generally composed of an emulsifier, oil, and water and other additives;
3. Oil-based muds which contain refined hydrocarbons, e.g. diesel oil, a few percent water, and additives; and
4. Water-in-oil emulsion muds which are often called inverted emulsion muds and consist of emulsifiers, water and oil, and other additives. The water-in-oil emulsion muds are the most popular for overcoming most of the serious drilling problems. A typical oil-external emulsion mud consists of diesel oil and water in a 7:3, 6:4, or 5:5 ratio to which may be added: (1) gelling and suspending agents such as clay-organo complexes; (2) emulsifiers such as anionic, sodium, and calcium salts of fatty acids, or cationic amine derivatives which supposedly are stable at high temperatures and in the presence of salt; (3) oil-wetting agents such as organic phosphates; and (4) filtration control agents such as clays or non-asphaltic organic colloids. The water-in-oil emulsion muds can be used as drilling fluids, completion fluids, or workover fluids and are generally preferred over water-based muds since the latter may cause problems with water-sensitive reservoirs. However, the water-in-oil emulsion muds are generally more expensive than the water-based muds. This added expense is generally justified to:

1. prevent formation damage to water-sensitive reservoirs,
2. maintain hole stability in heaving, dispersing, swelling, sticky, and sloughing shales by shielding the shales from free water;
3. prevent hole enlargement and permit coring in water-soluble rocks, such as salt;
4. secure full core recovery in unconsolidated formations;
5. obtain cores which have not been flushed by water filtrate;
6. maintain stable mud properties in deep and high temperature holes which require heavy mud;
7. prevent differential-pressure sticking of drill pipe;
8. prevent corrosion of drill pipe, casing, and tubing which reduces expensive workovers;
9. permit the use of aluminum drill pipe for deeper drilling by protecting aluminum from salt corrosion;
10. increase drilling rates by better lubrication and removal of shale cuttings without disintegration of cuttings; and
11. generally permit the obtaining of lower density drilling fluids than water-based muds. Another advantage with the water-in-oil emulsion muds is that they generally can be reclaimed for later use; this reduces the overall cost. Oil-external emulsion muds have found widely accepted use in the Gulf Coast area; Pennsylvania reservoirs of Central Oklahoma, the Arctic North Slope, and reservoirs in Russia. The water-in-oil emulsion muds generally have a high resistivity to electrical current due to the oil; such adversely affects electrical logging techniques.

From a logging standpoint, it is desirable that the drilling fluid be sufficiently conductive of electricity to provide a path for the electric current to pass from the current electrode into the formation. If the fluid is too conductive, short-circuiting can occur between the current and the measuring electrode resulting in a greatly dampened, characterless, and misleading log.

There are many patents teaching examples of drilling fluids: U.S. Pat. No. 2,696,468 to Fischer discloses a conductive oil-base drilling fluid containing up to 10% water, an electrolyte and an emulsifying agent. Fischer teaches that above 10% water the fluid loses its desired properties and becomes an emulsion-base fluid. Fischer in U.S. Pat. No. 2,739,120 teaches similar drilling fluids containing non-ionic surfactants.

U.S. Pat. No. 3,111,491 to Atkins, Jr. et al teaches that oil-base drilling fluids lose their desired properties when the water concentration exceeds 10%.

U.S. Pat. No. 3,110,668 to Anderson teaches an emulsion fluid composed of guar gum derivatives and a surface-active agent (nonionic and cationic). Anderson teaches that emulsions containing anionic surfactants are undesirable unless stabilized in accordance with his invention e.g. in the presence of calcium, magnesium, sodium, and similar materials which are generally encountered during drilling operations.

U.S. Pat. No. 3,264,214 to Stratton teaches the use of metal petroleum sulfonates prepared from high viscosity oils as effective defoaming agents for drilling fluids. The drilling fluid can be an emulsion.

SUMMARY OF THE INVENTION

Applicants have discovered an oil-external microemulsion mud which will conduct electrical current (such permits the use of ordinary electrical logging techniques), has suitable viscosity, gel strength, and low fluid loss characteristics, is more economical than conventional water-in-oil emulsion muds, is stable over a wide range of salinity conditions, is inherently corrosion-resistive, has desirable lubricity characteristics, a relatively high water concentration which permits more economical drilling fluids, and which exhibits an unusual characteristic of having more favorable rheological properties as the temperature of the microemulsion increases.

DESCRIPTION OF PREFERRED EMBODIMENTS

The water-in-oil microemulsions or oil-external microemulsions contain water, sodium petroleum sulfonate, hydrocarbon, bentonite, and optionally, cosurfactant, electrolyte, gelling agents, fluid loss agents, etc. The water concentration is about 15 to about 90%, preferably about 20 to about 75 and more preferably about 25 to about 50% by volume. The water can optionally contain electrolyte (water-soluble salts). Hydrocarbon is present in volume amounts of about 5 to about 84%, and preferably about 10 to about 78% and more preferably about 25 to about 70%. The sodium sulfonate is present in concentrations of about 1 to about 30% and preferably about 2 to about 20% and more preferably about 5 to about 10% by volume. Concentration of the bentonite is about 0.1 to about 15%, preferably about 1 to about 10% and more preferably about 2 to about 6% by weight. A cosurfactant, also identified as a semi-polar organic compound, can be present in amounts of about 0.01 to about 20% and preferably about 0.1% to about 5% by volume. Electrolytes or water-soluble salts, as mentioned earlier, can be added to the water within the microemulsion, e.g. in amounts of about 0.001 to about 5% and preferably about 0.1 to about 3% by weight, based on the aqueous medium. Other additives can be incorporated into the microemulsion, e.g. additives to impart low fluid loss characteristics.

The hydrocarbon can be crude oil, both sweet and sour, a partially refined fraction of crude oil (e.g. side cuts from crude columns, crude column overheads, gas oils, kerosene, heavy naphthas, naphthas, straight-run gasoline, liquefied petroleum gases); refined fractions of crude oil (propane, butane, pentane, decane, etc.) and synthesized hydrocarbons including halogenated hydrocarbons. From an economical standpoint, the hydrocarbon is preferably a partially refined fraction of crude oil (e.g. diesel fuel or a gasoline cut off of a crude column). Also, unsulfonated hydrocarbon within petroleum sulfonates is useful as the hydrocarbon. Examples of refined fractions of crude oil or synthesized hydrocarbon include paraffinic compounds such as liquefied petroleum gases, propane, pentane, heptane, decane, dodecane; cycloparaffinic compounds including cyclohexane, etc.; aryl compounds including mono as well as polycyclic compounds such as naphthenic and anthracenic compounds and substituted products thereof including toluene, alkyl phenols, etc.; halogenated hydrocarbons.

The water can be soft water, brackish water, or brine water. Where a high gel strength is desired, the water is preferably soft or distilled water. Also, where ions are present in the water, it is preferred that the ions are compatible with the ions within the subterranean formation being drilled into.

The petroleum sulfonate useful with Applicants' microemulsions are petroleum sulfonates and more particularly sodium petroleum sulfonates. The average equivalent weight of the sulfonate is within the range of about 350 to about 525, preferably about 400 to about 470 and more preferably about 410 to about 440. The petroleum sulfonate can be a monosulfonate, polysulfonate such as a disulfonate, or mixtures thereof. Also, the petroleum sulfonate can be a pure sulfonate or one having, for example, 50% or more and preferably about 60% or more active sulfonate. The petroleum sulfonate can be a mixture of high, medium, and low average equivalent weight petroleum sulfonates; however, the average equivalent weight of the sulfonate or sulfonates should be within the above indicated ranges.

The cosurfactant can be an alcohol, amine, ester, ether, aldehyde, ketone, or an organic compound containing one or more functional groups identical to the functional groups (e.g. —OH) within the previously mentioned cosurfactant compounds. The cosurfactant contains 1 to about 20 or more carbon atoms and preferably about 3 to about 16 carbon atoms. Preferably, the cosurfactant is an alcohol or an organic compound containing a hydroxyl group and one or more different functional groups, such as an ether group, etc. Examples of preferred cosurfactants include isopropanol, n- and isobutanol, amyl alcohol such as n-amyl alcohol and p-amyl alcohols, 1- and 2-hexanol, 1- and 2-octanol, decyl alcohols, alkaryl alcohols such as p-nonyl phenol and alcoholic liquors such as fusel oil. Mixtures of two or more cosurfactants are useful with this invention.

The electrolyte can be a water-soluble inorganic base, inorganic acid, or inorganic salt; preferably it is the latter. Examples of electrolytes include sodium hydroxide, sodium chloride, sodium sulfate, hydrochloric acid, sulfuric acid, sodium nitrate, ammonium chloride, ammonium hydroxide, potassium chloride, etc. Examples of other useful electrolytes will depend upon the hydrocarbon, aqueous phase, surfactant and cosurfactant, reservoir fluids, reservoir temperature, etc.

The microemulsion can be prepared by dissolving the petroleum sulfonate in the hydrocarbon, then adding water to obtain a desired viscosity. The cosurfactant can optionally be dissolved in the hydrocarbon phase and electrolyte can be dissolved in the water phase. The bentonite is incorporated into the microemulsion by mixing it with the water phase and then combining this bentonite-water sec-with a mixture consisting of the hydrocarbon, petroleum sulfonate, and optional cosurfactant. The amount of water within the microemulsion is directly dependent on the viscosity. Other components of the microemulsion directly influence the viscosity, e.g. the concentration and type of cosurfactant, the concentration and average equivalent weight of the petroleum sulfonate, the amount of electrolyte within the aqueous phase of the microemulsion, the temperature of the microemulsion, etc.

The microemulsion contains a water-dispersible clay, the dispersibility properties can result from chemical and/or physical properties of the clay. Preferably, the clay has a high degree of hydration, such as bentonite, a clay containing mostly montmorillonite, with minor amounts of quartz, cristobalite, biotite, etc. Other kinds of clays commonly used in drilling fluids may be used in the microemulsion. Examples of useful clays include Aquagel (a trademark of Baroid Division, National Lead Co., Houston, Texas, U.S.A. and identifies a Wyoming bentonite); Baroco (a trademark of Baroid Division, and identifies a clay that is not as rich in montmorillonite as the Aquagel clay); Zeogel (a trademark of Baroid Division and identifies an attapugite clay used to impart gel strength to salt-water muds); and similar types of clays. The bentonite clays are especially useful with the invention.

Other additives may be incorporated into the microemulsions to impart desired characteristics to the drilling fluids. Such additives are known in the art and include weighting agents such as barium sulfate, lost circulation agents such as plant fibres, shredded rubber, plastic foil, mica flakes; and preservatives, such as chemical bactericides, fungicides, and anti-fermentatives. However, such additives must be compatible with the microemulsion, i.e they must not react with components of the microemulsion to phase-separate the microemulsion or to impart adverse chemical properties thereto.

To teach preferred embodiments of the invention, Applicants compared their microemulsion drilling fluids to commercially available drilling fluids. Also, Applicants' microemulsions were tested with other components knwon in the art and the particular preferences necessary for Applicants' microemulsion were substantiated by laboratory experiments. The following discussion presents the laboratory evaluation:

LABORATORY MEASUREMENTS

Laboratory testing of the drilling fluids, is based on standard procedures recommended by the American Petroleum Institute (API Recommended Practice RP 13B, Second Edition, April, 1969). In certain cases, the standard procedures were modified to measure mud properties at elevated temperatures.

MUD WEIGHT

Mud weight or density is expressed in pounds per gallon. In each example, the amount of weighting material necessary to give a weight of ten pounds per gallon was calculated and added to every sample.

VISCOSITY, YIELD POINT AND GEL STRENGTH

These measurements were done with a multi-phase direct-indicating Fann V-G viscometer as recommended by API Recommended Practice 13B, pp. 5–6. However, the recommended instrument and procedure were modified to measure the rheological properties of the drilling fluid at elevated temperatures-- this was done by wrapping a heating coil around the sample container, and letting the sample and instrument equilibrate to a preselected temperature before measurement. The viscosity in centipoises is expressed as plastic viscosity and/or as apparent viscosity. Yield point and gel strength are expressed in pounds per 100 sq. ft. The gel strength or thixotropy is measured 10 seconds after the sample has been stirred vigorously and is measured a second time 10 minutes after vigorous stirring---procedure is given in page 6 of API RP 13B.

FILTRATION TESTS

Filtration tests were conducted at room temperature and at elevated temperatures using a high-temperature mud cell defined in U.S. Pat. No. 3,617,868 to Beitel et al.

RESISTIVITY

Resistivity of the drilling fluid is measured at room temperature and at elevated temperature using the mud cell identified in U.S. Pat. No. 3,617,868 to Beitel et al. Resistivity is reported in ohm-meters.

NECESSITY OF USING SODIUM PETROLEUM SULFONATE WITHIN MICROEMULSION

Oil-external microemulsions were made with ammonium petroleum sulfonates. Three common drilling mud clays, i.e. Aquagel, Baroco, and Zeogel (these are trademarks of Baroid Division, National Lead Company, Houston, Texas), were separately added to the microemulsion. All of these three clays caused the microemulsion to phase separate into two to six distinct layers. Some of these layers differed only in amount and particle size of clay but other layers were of different compositions from the original microemulsion. The refractive index measurements of the filtrate from different layers verified phase separation of the microemulsion.

It was rationalized that the reason for phase separation probably was due to the relative order of preference with which cations compete for exchange positions on clay structures. That is, the ammonium cation on the sulfonate is attracted preferentially to the clays where it replaces cations initially on the clays. Thus, the sulfonate loses the ammonium cation and gains cations which adversely influence the stability of the microemulsion.

An identical microemulsion was made with sodium petroleum sulfonate. Upon addition of the previously mentioned clays, the microemulsion did not phase separate. The composition of the microemulsion is:

| Component | Amount | and Type |
|---|---|---|
| Sodium petroleum sulfonate | 8.04 | gm Petronate HL |
| | 9.46 | gm Pyronate 50 |
| Hydrocarbon | 37.9 | ml Diesel fuel |
| Cosurfactant | 1.0 | ml p-amyl alcohol/100 ml. microemulsion components |
| Water | 29.14 | ml water containing 28,000 ppm total dissolved solids. |

Petronate HL sulfonate has an average equivalent weight of 450 and an activity of about 62%; and, Pyronate 50 has equivalent weight of about 360, and contains about 50% active sulfonate--these sulfonate trademarks belong to Sonneborn Chemical Co., New York, N.Y., U.S.A. The microemulsion first tested had the same composition except the ammonium petroleum sulfonate replaced the sodium petroleum sulfonate--the ammonium petroleum sulfonate had an average equivalent weight of about 400 and is about 8% active sulfonate. These microemulsions are oil-external and phase stable over the temperature range of about 70° to about 185° F.

To the microemulsion containing the sodium petroleum sulfonate there is added various amounts of dry Aquagel and Barite (finely divided barium sulfate). The microemulsion did not phase separate. However, measured gel strength of the composition was too low for suitable drilling fluids. The clay and barite tended to settle from the microemulsion even though the microemulsion was phase stable. It is postulated that the clay-water interaction is necessary to impart gel strength; by adding dry clay to the oil-external microemulsion, the clay and water were effectively sequestered from one another. This adversity was cured by adding the clay in a clay-water suspension rather than adding dry clay to the microemulsion. To obtain maximal gel strengths, the clay can be mixed with soft water, or water containing a very minimum salt content and the clay-water slurry added to the microemulsion drilling fluids--e.g. compare Sample D with Sample E in Table 1. However, Sample E which contains 28,000 ppm of TDS still has sufficient gel strength to be operative as a good drilling fluid.

It is postulated that the clay, barite and other water dispersible materials are contained within the micelles of the microemulsion and because the microemulsion is thermodynamically stable, the water dispersible materials within the micelles cannot separate due to gravity. That is, the micelles contain water and they are thermodynamically dispersed within the oil phase; thus, any water dispersible material within the water is also "thermodynamically dispersed" and will not settle out due to gravity.

RHEOLOGICAL PROPERTIES

Rheological properties of the microemulsion drilling fluids are illustrated in Table 1. This particular drilling fluid had a composition identical to that of the previously described sodium petroleum sulfonate microemulsion drilling fluid except where indicated, the water either had 28,000 ppm of TDS (total dissolved solids) or had essentially 0 ppm of TDS. As is evident from Table 1, the rheological properties are decidedly lower in the presence of salts; however, with a concentration of 28,000 ppm of TDS in the water, the rheological properties are still within operational range of conventional drilling fluids. The rheological properties were determined at 74° F. and at different weight concentrations of Aquagel in the microemulsion; the Aquagel was added by first obtaining an aqueous mixture of the Aquagel in water and then adding it to an anhydrous microemulsion stock solution. In each case, the mud weight of the microemulsion is adjusted to ten pounds per gallon by adding barite. Also, the apparent viscosity is determined at 100 rpm and at a shear rate of 100 rpm = 170.4 sec-11. Rheological properties of particular microemulsions are indicated in Table 1:

TABLE 1

| Sample* | Weight % Aquagel | Water | Apparent Viscosity (cp) | Gel Strength (10 Sec/10 Min) lbs/100 ft$^2$ | Yield Value lbs/100 ft$^2$ |
| --- | --- | --- | --- | --- | --- |
| A | 0.37 | distilled H$_2$O | 272 | 4/5 | N.M.+ |
| B | 0.75 | " | 320 | 5/7 | " |
| C | 2.24 | " | 530 | 11/14 | " |
| D | 2.99 | " | 620 | 24/33 | " |
| E | 2.99 | 28,000 ppm TDS | 130 | 8.5/6 | 17 |

+N.M.=not measurable with available instrument
*=The compositions are identical to the microemulsion previously described except the water is replaced by the indicated water within Table 1.

As is evident from the above table, the apparent viscosities and gel strengths increase with increasing clay content. Although the gel strengths are acceptable, the viscosities of the above-indicated microemulsions may be too high for conventional field applications; however, these examples show that oil-external microemulsions obtained with distilled water (distilled water promotes the maximum possible clay swelling) will yield very high viscosities. These high viscosities can be decreased by either increasing the water concentrations or adding salts--see Sample E wherein the water contains 28,000 ppm of TDS and the apparent viscosity is 130 (this corresponds to a plastic viscosity of 83 centipoises). This table also indicates that mud-like gel strength and high viscosity values can be obtained with less than 3% Aquagel-- ordinary water-based muds may require 5 to 10% Aquagel to produce similar mud properties. These high viscosity, oil-external microemulsions have particular utility in reservoirs at very high temperatures, e.g. at high temperatures above 200° F. where the microemulsion is still stable but the viscosity of the microemulsion is substantially reduced from Table 1 values.

EFFECTS OF TEMPERATURE AND AQUAGEL

Effects of temperature and the concentration of Aquagel in the microemulsion are illustrated in Table 2. The composition of the microemulsion in this Table is identical to that earlier defined except the water is replaced with distilled water.

TABLE 2

| Sample | Wt.% Aquagel | Temp. F°. | Apparent Viscosity (cp at 100rpm) | Plastic Viscosity (cp) | Yield Value lbs/100 ft$^2$ | Gel Strength (10 Sec/10 Min) lbs/100 ft$^2$ |
| --- | --- | --- | --- | --- | --- | --- |
| F | 0.75 | 74 | 330 | N.M. | N.M. | 5/7 |
| G | " | 100 | 204 | N.M. | N.M. | 4/6 |
| H | " | 150 | 93 | 73 | 11 | 5/6.5 |
| I | " | 195 | 58 | 42 | 6 | 5/6 |
| J | 2.24 | 74 | 590 | N.M. | N.M. | 11/14 |
| K | " | 100 | 360 | N.M. | N.M. | 14/19 |
| L | " | 140 | 215 | N.M. | N.M. | 14/20 |

TABLE 2-continued

| Sample | Wt.% Aquagel | Temp. F°. | Apparent Viscosity (cp at 100rpm) | Plastic Viscosity (cp) | Yield Value lbs/100 ft² | Gel Strength (10 Sec/10 Min) lbs/100 ft² |
|---|---|---|---|---|---|---|
| M | " | 180 | 155 | 78 | 29 | 11/23 |
| N | 2.99 | 74 | 630 | N.M. | N.M. | 24/33 |
| O | " | 100 | 330 | N.M. | N.M. | 22.5/33 |
| P | " | 140 | 260 | N.M. | N.M. | 26/44 |
| Q | " | 190 | 240 | 85 | 53 | 29/67 |

From Table 2 it is evident that the rheological and thixotropic properties of the microemulsion increase with relatively small increases in Aquagel content. Also, it is evident that the viscosity and yield values decrease markedly with increase in temperature--this is a distinct operational advantage since muds of this type are usually used at relatively high downhole temperatures. The viscosities and yield values above 150° F. are comparable to published values for prior art types of drilling muds. Also, the gel strengths increased markedly with increasing temperature--again, this is a distinct advantage.

A commercially available oil-external emulsion drilling mud was obtained from Baroid Division, National Lead Company, Houston, Texas, the drilling mud having the composition:

| Component | Concentration | |
|---|---|---|
| Diesel Fuel No. 2 | 0.537 | (bbl) |
| Water | 0.228 | (bbl) |
| Invermul | 15 | (lb active emulsifier) |
| Duratone | 8 | (lb filtrate control) |
| Petrotone | 4 | (lb. natural clay) |
| Geltone | 2 | (lb synthetic clay) |
| Barite | 349 | (lb weight agent) |

Properties of the drilling muds are as follows:

| | |
|---|---|
| Weight, lb/gal | 14.5 |
| Plastic viscosity, cp at 74° F. | 77 |
| Yield Pt., 11/100 sq ft | 33 |
| 10-Sec Gel, lb/100 sq ft | 15 |
| 10-min Gel, lb/100 sq ft | 18 |
| Elec. Stability, v | 520+ |

The components in the drilling mud are: Invermul (a trademark of Baroid Division, National Lead Co., Houston, Texas, and identifies an active emulsifier readily dispersible in oil); Duratone (a trademark of Baroid Division, identifies a synthetic organophilic colloid); Petrotone (a trademark of Baroid Division, identifies a clay-like material that increases the suspending properties of crude or refined oils and oil muds); and Geltone (a trademark of Baroid Division, identifies a synthetic organophilic colloid). This drilling mud essentially contains diesel fuel and water (applicants' microemulsion also contains these components), but has less of a water/oil ratio than does Applicants' illustrated microemulsion. This oil-external emulsion drilling mud, at 74° F., has a plastic viscosity of 77 cp., a yield point of 33 lbs/100 sq. ft., a gel strength of 15 lbs/100 sq ft at 10 sec and 18 lbs/100 sq ft at 10 min. These values are within the range of values for Applicants' microemulsion drilling fluid at elevated temperatures. By comparing this prior art oil-external emulsion drilling mud with Applicants' microemulsion, it is evident that Applicants' microemulsion drilling fluid, at elevated temperatures, has at least equal rheological properties. This is a decided advantage of Applicants' microemulsion drilling fluids over the prior art. Also, if it is desired to lower these rheological properties of Applicants' microemulsion drilling fluids, the relative concentrations of the components can be adjusted by adding water, salt, etc., to suit the particular needs of a reservoir.

FILTRATION AND RESISTIVITY PROPERTIES

The resistivity and filtration characteristics are a function of temperature and Aquagel content, are illustrated in Table 3. In each case the mud weight of the microemulsion is adjusted to 10 lbs per gallon by addition of barite. Also, the composition of the microemulsion is identical to that described previously except the water contains about 600 ppm. of TDS or salts.

TABLE 3

| Sample | Wt. % Aquagel | Temp. F° | Fluid Loss ml/30 min. | Resistivity, ohm-meters |
|---|---|---|---|---|
| R | 0.75 | 74 | 4 | 0.91 |
| S | " | 100 | 4 | 0.58 |
| T | " | 150 | 4 | 0.26 |
| U | " | 200 | 8 | 0.16 |
| V | " | 290 | 13.6 | 0.04 |
| W | 2.24 | 74 | <1 | 0.99 |
| X | " | 100 | <1 | 0.73 |
| Y | " | 150 | 2 | 0.47 |
| Y | " | 200 | 4 | 0.32 |
| AA | " | 280 | 11 | 0.30 |
| BB | 2.99 | 74 | 0 | 1.30 |
| CC | " | 100 | 0 | 0.89 |
| DD | " | 150 | 2 | 0.62 |
| EE | " | 200 | 2 | 0.43 |
| FF | " | 290 | 14 | 0.36 |
| GG | Baroid Water-in-Oil Emulsion Mud | 74 | 0 | N.M.+ |
| HH | Emulsion Mud | 100 | 2 | " |
| II | Emulsion Mud | 150 | 2 | " |
| JJ | Emulsion Mud | 200 | 8 | " |
| KK | Emulsion Mud | 290 | 12 | " |

From Table 3 it is evident that Applicants' oil-external microemulsions have a very low fluid loss or filtration characteristic--this is highly desirable to prevent formation damage or to stabilize the well bore and also has a distinct advantage for log interpretation purposes. The resistivity values of Applicants' oil-external microemulsions are comparable to those of ordinary water-based muds--this is an advantage in electrical logging; most water-in-oil emulsion muds such as are illustrated by Samples GG through KK will not conduct a measureable current and thus are not suited for electrical logging procedures. Applicants' oil-external microemulsions, however, conduct sufficient electrical current to permit electrical logging. Resistivities of Applicants' microemulsions increase with increasing Aquagel content and decrease with increasing temperature.

ADVANTAGES OF OIL-EXTERNAL MICROEMULSION DRILLING FLUIDS

Applicants' oil-external microemulsion drilling fluids enjoy the same advantages as do oil-external emulsion muds over water-based muds, oil-in-water emulsion muds and oil-based muds. However, Applicants' oil-external microemulsion muds have advantages over the oil-external emulsion muds in that:

1. the oil-external microemulsion muds conduct electrical current, this is needed for ordinary electrical logging techniques--most presently used oil-based emulsion muds do not;
2. Applicants' oil-external microemulsion drilling fluids use ordinary, untreated bentonite, e.g. the Wyoming bentonite clay, to impart suitable viscosity, gel strength, and filtration characteristics--the currently available oil-external emulsion muds require pretreated clays to make them oleophilic, and also require organic colloids and oil-wetting agents to give the necessary properties;
3. Applicants' oil-external microemulsion drilling fluids require less clay than do the presently available oil-external emulsion muds;
4. Applicants' oil-external microemulsion drilling fluids are stable over a wide range of salt concentrations--such advantage is an economical advantage as well as an operational advantage--the samples teach oil-external microemulsions containing 28,000 ppm. of TDS, this is a salt concentration approaching that of sea water;
5. the inherent properties of Applicants' oil-external microemulsion drilling fluids eliminate the need for several classes of drilling fluid additives such as corrosion inhibitors, emulsifiers, filtrate-reducers, lubricants, thinners, and viscosifiers--the properties of the microemulsion can be controlled merely by altering the composition of the principal components, i.e. clay, water, alcohol, hydrocarbon, etc.,
6. Applicants' oil-external microemulsion drilling fluids have higher water contents than do the conventional oil-external emulsion muds--this is a decidedly economical advantage, and
7. Applicants' oil-external microemulsions are viscoelastic and allow for drag reduction, the emulsions are not viscoelastic. In essence, Applicants' oil-external microemulsion muds are more economical than conventional emulsion muds and conduct sufficient electricity to permit the use of electrical logging techniques.

It is not intended that Applicants' invention be limited by the specifics taught herein. Rather, all equivalents obvious to those skilled in the art are intended to be incorporated within the scope of the invention as defined within the specification and appended claims.

What is claimed is:

1. An oil-external microemulsion drilling fluid which will conduct sufficient electrical current needed for electrical logging of a subterranean formation, the microemulsion comprised of about 15% to about 90% by volume water, about 5 to about 84% by volume liquid hydrocarbon, about 1% to about 30% by volume of a sodium petroleum sulfonate having an average equivalent weight of about 350 to about 525, and about 0.1% to about 15% by weight, based on the water, of a water-dispersible clay, said clay having been incorporated in the microemulsion by mixing it with the water phase and then mixing the clay-water mixture with the remaining ingredients of the microemulsion.

2. The microemulsion of claim 1 wherein it contains about 0.01 to about 20% by volume cosurfactant.

3. The composition of claim 2 wherein the cosurfactant is an alcohol containing about 1 to about 20 carbon atoms.

4. The composition of claim 1 wherein the liquid hydrocarbon is a refined fraction of crude oil.

5. The composition of claim 1 wherein the petroleum sulfonate is present in concentrations of about 2% to about 20%.

6. The composition of claim 1 wherein the petroleum sulfonate is present in concentrations of about 5 to about 10% by volume.

7. The composition of claim 1 wherein the average equivalent weight of the petroleum sulfonate is about 400 to about 470.

8. The composition of claim 1 wherein the microemulsion contains about 2 to about 6% by weight, based on the water, of the water-dispersible clay.

9. The composition of claim 1 wherein the microemulsion contains about 1 to about 10% by weight, based on the water, of a water-dispersible clay.

10. The composition of claim 1 wherein the clay is bentonite.

11. The composition of claim 1 wherein the clay is comprised of montmorillonite.

12. The composition of claim 1 wherein the microemulsion contains barite.

13. The composition of claim 1 wherein it contains about 20% to about 75% water.

14. An oil-external microemulsion drilling liquid which will conduct sufficient electrical current needed for electrical logging of a subterranean formation, the microemulsion comprised of:
   1. about 5% to about 78% by volume of liquid hydrocarbon which is crude oil, partially refined fraction(s) of crude oil or refined fraction(s) of crude oil,
   2. about 20% to about 75% by volume of water containing about 0.1% to about 15% by weight, based on the water, of a water-dispersible clay,
   3. about 2% to about 20% by volume of a sodium petroleum sulfonate having an average equivalent weight of about 350 to about 525,
   4. about 0.01% to about 25% by volume of a cosurfactant selected from the group consisting of alcohol, amine, ester, aldehyde, ketone, ether, and mixtures of said cosurfactant, the cosurfactant which is a semi-polar compound containing about 1 to about 20 carbon atoms, and
   5. about 0.001% to about 5% by weight of electrolyte which is an inorganic base, inorganic acid, or inorganic salt or combination thereof said clay and said water having been premixed prior to admixture with the remaining components of said microemulsions.

15. The microemulsion of claim 14 wherein the cosurfactant contains about 3 to about 16 carbon atoms.

16. The microemulsion of claim 14 wherein the cosurfactant is an alcohol.

17. The microemulsion of claim 14 wherein the petroleum sulfonate has an average equivalent weight within the range of about 380 to about 470.

18. The microemulsion of claim 14 wherein the cosurfactant has a water solubility of about 0.01% to about 20% at ambient temperature.

19. The microemulsion of claim 14 wherein the hydrocarbon is a refined fraction of crude oil.

20. The microemulsion of claim 14 wherein the water-dissible clay is present in concentrations of about 2 to about 6%.

21. The microemulsion of claim 14 wherein the water-dispersible clay is comprised of bentonite.

22. The microemulsion of claim 14 wherein the water-dispersible clay is comprised of montmorillonite.

23. The microemulsion of claim 14 wherein the water is soft.

24. The microemulsion of claim 14 wherein the microemulsion contains barite.

* * * * *